US012607981B2

(12) United States Patent (10) Patent No.: US 12,607,981 B2
Gritzer et al. (45) Date of Patent: Apr. 21, 2026

(54) DISTRIBUTED ROBOTICS LOG PROCESSING

(71) Applicant: Model-Prime, Inc., Pittsburgh, PA (US)

(72) Inventors: Jeanine Jandecka Gritzer, Pittsburgh, PA (US); Arun Venkatadri, Pittsburgh, PA (US)

(73) Assignee: Model-Prime, Inc., Pittsburgh, PA (US)

( * ) Notice: Subject to any disclaimer, the term of this patent is extended or adjusted under 35 U.S.C. 154(b) by 520 days.

(21) Appl. No.: 18/110,197

(22) Filed: Feb. 15, 2023

(65) Prior Publication Data

US 2023/0280721 A1 Sep. 7, 2023

Related U.S. Application Data

(60) Provisional application No. 63/316,205, filed on Mar. 3, 2022.

(51) Int. Cl.
G05B 19/4155 (2006.01)
(52) U.S. Cl.
CPC ............... G05B 19/4155 (2013.01); G05B 2219/40213 (2013.01)
(58) Field of Classification Search
CPC ............... G05B 19/4155; G05B 2219/40213
See application file for complete search history.

(56) References Cited

U.S. PATENT DOCUMENTS

| | | | |
|---|---|---|---|
| 2005/0138483 A1* | 6/2005 | Hatonen | G06F 21/552 |
| | | | 714/45 |
| 2009/0210373 A1 | 8/2009 | Yu et al. | |
| 2012/0197852 A1 | 8/2012 | Dutta et al. | |
| 2012/0197856 A1 | 8/2012 | Banka et al. | |
| 2017/0139961 A1 | 5/2017 | Baum et al. | |
| 2019/0026359 A1* | 1/2019 | Park | G06F 16/00 |
| 2020/0356537 A1* | 11/2020 | Sun | G06F 16/137 |
| 2022/0036302 A1* | 2/2022 | Cella | H04L 67/1097 |

OTHER PUBLICATIONS

PCT International Search Report and Written Opinion, PCT Application No. PCT/US23/14519, May 25, 2023, twelve pages.

* cited by examiner

*Primary Examiner* — Gary Collins
(74) *Attorney, Agent, or Firm* — Fenwick & West LLP

(57) ABSTRACT

Processing of robotics log data may be performed onboard the robotics itself and log data may be converted to a form that is more suitable for parallel processing. In one aspect, robotics log data may include multiple channels. These channels are received and are used to generate data packages referred to as shards. Each shard is associated with a time window. For example, each shard may contain the robotics log data from all channels for the relevant time window. Additional data, such as an index and metadata, may be included with the shards so that each shard may be processed independently. Each shard is independently consumable and, as a result, the shards may be processed in parallel to accomplish some task. Furthermore, the creation of shards and the subsequent processing of shards may occur onboard the robotics itself.

18 Claims, 11 Drawing Sheets

Shard Definition

Shard Configuration

410

| Condition | Example Value |
|---|---|
| Default duration | 1.5 s |
| Min duration | 1 s |
| Max Duration | 2.5 s |
| Shard Start | $t_0$ |
| Shard End | $t_1$ |

420

| Condition | Example Value |
|---|---|
| Default Channel First Msg | Msg Timestamp =< $t_0$ |
| Default Channel Last Msg | Msg Timestamp < $t_1$ |
| Channel E First Msg | $t_0$ <= Msg Timestamp |
| Channel E Last Msg | Msg Timestamp < $t_1$ |

FIG. 4A

Process Output

| Process ID | Shard Processed | Output ID | Log Start Time | Log End Time |
|---|---|---|---|---|
| p000 | shard00 | o000_00_00 | 0.10 | 0.50 |
| p000 | shard00 | o000_00_01 | 0.90 | 1.20 |
| p000 | shard00 | o000_00_02 | 1.45 | 1.49 |
| p001 | shard00 | o001_00_00 | 0.00 | 1.49 |
| p000 | shard01 | o000_01_00 | 1.50 | 1.70 |
| p001 | shard01 | o001_01_00 | 1.50 | 2.99 |
| p001 | shard02 | o001_02_00 | 3.00 | 4.49 |
| ... | ... | ... | ... | ... |

FIG. 5B

Process Status

| Process ID | Shard Processed | Status |
|---|---|---|
| p000 | shard00 | complete |
| p000 | shard01 | in process |
| p000 | shard02 | complete |
| p000 | shard03 | complete |
| p001 | shard00 | complete |
| p001 | shard01 | not started |
| p001 | shard02 | complete |
| p001 | shard03 | in process |
| ... | ... | ... |

FIG. 5A

Example: p000 stitching

Stitch two output rows where:
- $processID_0 == processID_1 == p000$
- $shard_0$ and $shard_1$ are sequential
- $endTime_1 - endTime_0 <= 0.01$

| Process ID | Shard Processed | Output ID | Log Start Time | Log End Time | Stitched |
|---|---|---|---|---|---|
| p000 | shard00 | o000_00_02 | 1.45 | 1.49 | true |
| p000 | shard01 | o000_01_00 | 1.50 | 1.70 | true |

| Process ID | Shards Stitched | Output ID | Log Start Time | Log End Time |
|---|---|---|---|---|
| p000 | shard00_shard01 | stitch_000_00_01 | 1.45 | 1.70 |

FIG. 5C

Example: p001 stitching

Stitch two or more output rows where:
- $processID_0 == processID_1 == p001$
- while $shard_0$ through $shard_n$ are sequential
- $endTime_n - endTime_{n-1} <= 0.01$

| Process ID | Shard Processed | Output ID | Log Start Time | Log End Time | Stitched |
|---|---|---|---|---|---|
| p001 | shard00 | o001_00_00 | 0.00 | 1.49 | true |
| p001 | shard01 | o001_01_00 | 1.50 | 2.99 | true |
| p001 | shard02 | o001_02_00 | 3.00 | 4.49 | true |

| Process ID | Shards Stiched | Output ID | Log Start Time | Log End Time |
|---|---|---|---|---|
| p001 | shard00_shard02 | stitch_001_00_02 | 0.00 | 4.49 |

FIG. 5D

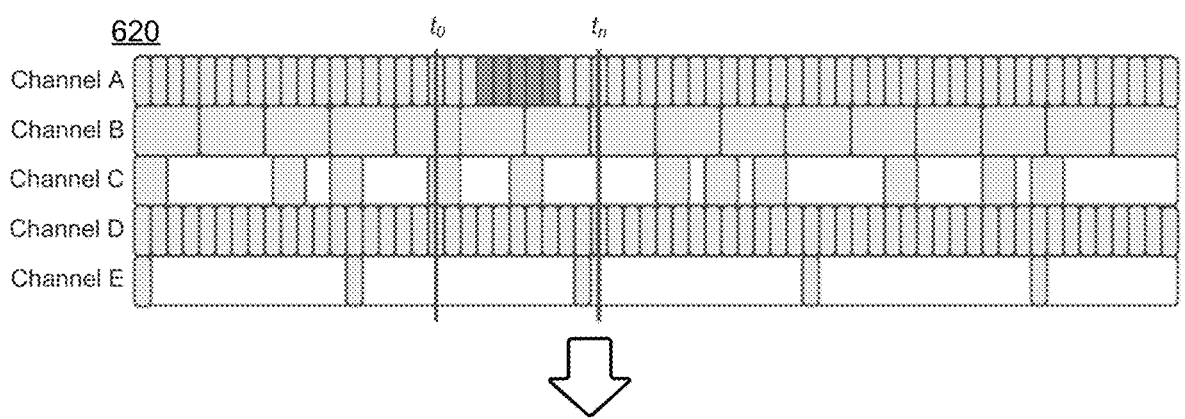

630 Log Slice Processing + Integrity Check

632 Event Configuration

| Condition | Value |
|---|---|
| Event Start ($t_0$) | (Object *x* detection start) - 5 sec |
| Event End ($t_1$) | (Object *x* no longer detected) + 5 sec |
| Channel A Start | *First message timestamp* =< $t_0$ |
| Channels B, C, E Start | First message timestamp =< $t_0$ |
| Channels A, B, C, E End | Last message timestamp =< $t_1$ |

Note: any condition within channel data could replace the object detection condition, such as a telemetry value exceeding threshold

634 Integrity Check

Channel A Message Hash

Channel B Message Hash

Channel C Message Hash

Channel E Message Hash

Origin Hash generated from source message payloads

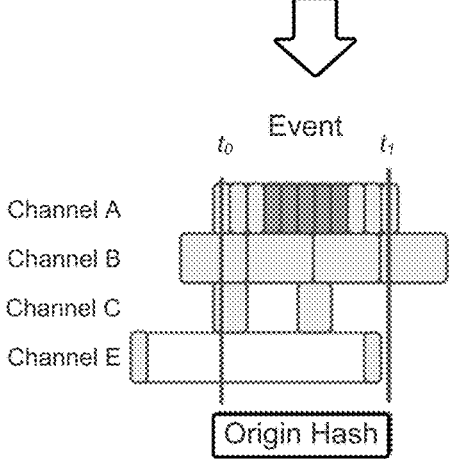

Event

Channel A
Channel B
Channel C
Channel E

Origin Hash

FIG. 6B

DISTRIBUTED ROBOTICS LOG PROCESSING

CROSS-REFERENCE TO RELATED APPLICATION(S)

This application claims priority under 35 U.S.C. § 119(e) to U.S. Provisional Patent Application Ser. No. 63/316,205, "Apparatus and Method for Distributed Robotics Log Processing," filed Mar. 3, 2022. The subject matter of all of the foregoing is incorporated herein by reference in its entirety.

BACKGROUND

1. Technical Field

This disclosure relates generally to processing and storing logs, including robotics logs.

2. Description of Related Art

Current robotics log formats and processes were designed before the scale that the industry has achieved and prior to many of the recent "big data" and cloud computing break-throughs. Thus, they have not been designed with large data volumes and distributed computation in mind. In addition to the format, many of the processing capabilities and work-flows are insufficient to support the current scale and volume that currently exists.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIGS. 4A-4C are diagrams of generating shards from log data using user-configured shard definitions.

FIGS. 5A-5D are diagrams of further processing of shards.

FIGS. 6A and 6B are diagrams of log slicing.

DETAILED DESCRIPTION OF THE PREFERRED EMBODIMENTS

Figure 1:
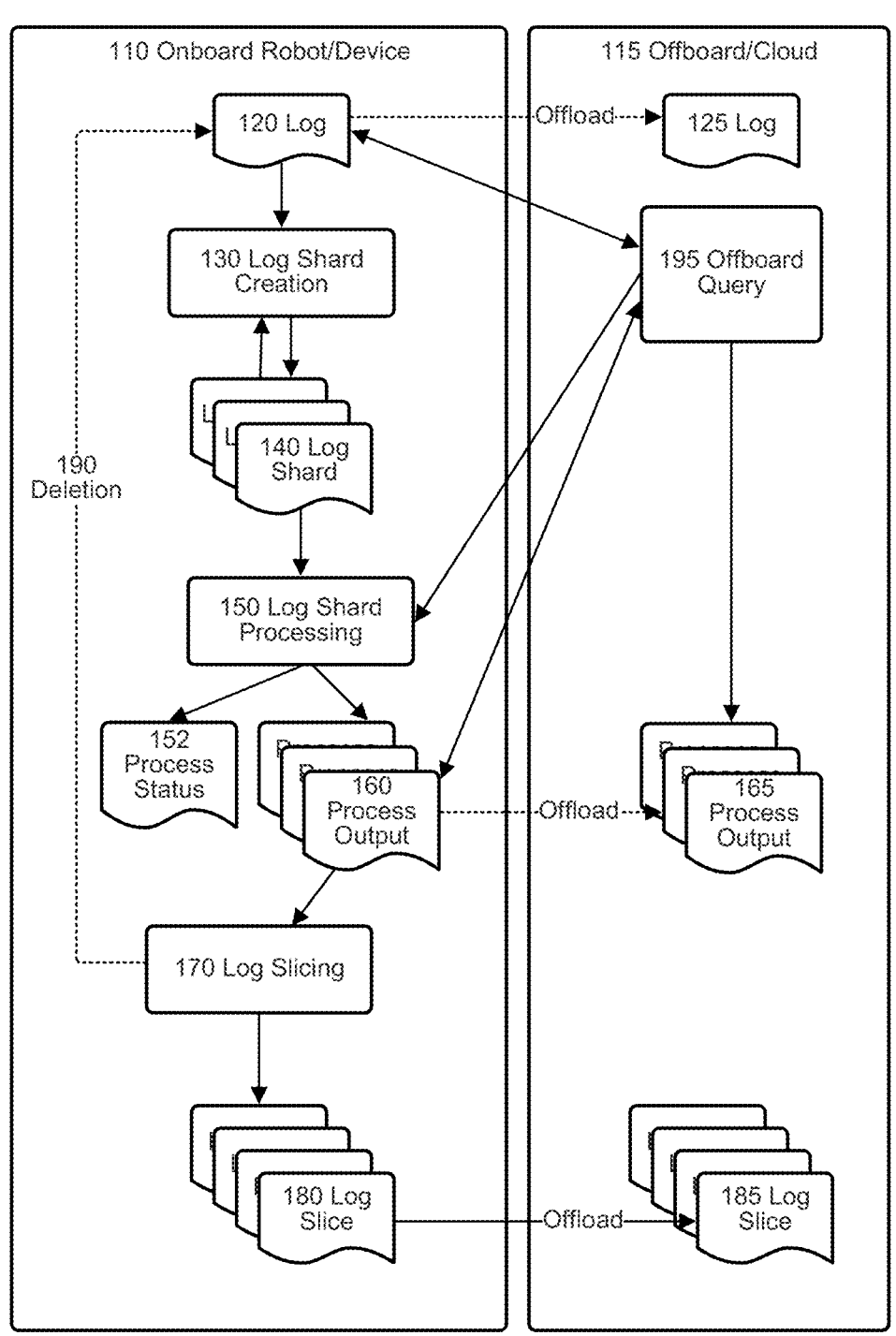
FIG. 1 is a diagram of onboard shard processing.

The figures and the following description relate to pre-ferred embodiments by way of illustration only. It should be noted that from the following discussion, alternative embodiments of the structures and methods disclosed herein will be readily recognized as viable alternatives that may be employed without departing from the principles of what is claimed.

In robotics, logging is important for many reasons. A robotics log is used to record and later analyze the behavior of the robotics, to record sensor data that may be used in machine learning and deep learning training and validation, and to seed simulation and offline software validation pro-cesses. Without robotics logs, in some cases, there may be no record of the sensor inputs and subsequent actions. For this same reason, robotics logs may be kept to ensure compliance with a company's internal policies and/or legal requirements.

However, in many cases, robotics logs are offloaded in their entirety into the cloud and processed serially. This can result in high volumes of data bring stored unnecessarily in the cloud, delays in post-processing logs to programmati-cally identify data of interest, and long delays before the logs are available for manual analysis before the resulting analy-sis can be evaluated and appropriate actions taken.

In the approaches described in this disclosure, log pro-cessing may be performed onboard the robotics itself and log data may be converted to a form that is more suitable for parallel processing. In one aspect, robotics log data may include multiple channels. These channels are received and are used to generate data packages referred to as shards. Each shard is associated with a time window. For example, each shard may contain the robotics log data from all channels for the relevant time window. Additional data, such as an index and metadata, may be included with the shards so that each shard may be processed independently. Each shard is independently consumable and, as a result, the shards may be processed in parallel to accomplish some task. Furthermore, the creation of shards and the subsequent processing of shards may occur onboard the robotics itself.

This can provide the following advantages. Sharing and shard processing enable efficient use of onboard compute resources by allowing for parallel processing of shards, particularly in situation where onboard resources are other-wise idle. Analysis performed during shard processing allows for metrics gathering and identification of interesting events which are used to create log slices. By offloading metrics and log slices only, entire raw logs do not need to be offloaded and instead can be deleted from the onboard storage. This results in a reduction in data transmission from the robot to on-premises or cloud infrastructure, which requires less networking bandwidth and allows relevant data to be available more quickly to downstream software devel-opment or reporting processes.

Where entire raw logs are offloaded from the robotics to on-premises or cloud infrastructure (e.g., due to onboard compute resource constraints or due to regulatory or com-pliance retention requirements), shard and slice processing in the cloud enable faster processing of log data, thus allowing faster access to useful data, and enable lower volumes of data transfer between processes. For example, log slices rather than entire raw logs can be transferred to third-party vendors for machine learning ground-truth labels or for re-simulation. The ability to slice logs also allows for raw log data to be deleted or archived when appropriate while retaining hot access to the specific data that is useful, thus reducing storage costs.

FIG. 1 is a diagram of onboard shard processing. The left box 110 includes processes that occur on the robotics or associated devices (referred to as onboard), and the right box 115 includes processes that occur elsewhere (offboard). The robotics produces log data 120. At 130, the robotics log data 120 is processed (or sharded) to produce the shards 140 generated from the log data 120. At 150, the shards 140 are processed to produce desired outputs 160. For example, this may be the identification of events within shards, including start and end times of events. Status 152 provides an indication of progress. Log slicing 170 may be applied to produce log slices 180. As processing takes place, the original log data 120 may be deleted 190 if not needed for other purposes.

When the log data is processed onboard the robotics, the log data may be sharded based on 1) user input or preferences, 2) available compute and storage resources onboard, and 3) processing time optimizations. The log data may be processed in these shards in a parallel fashion and the output of these processes, along with processing status, is placed into onboard storage and optionally offloaded later to the cloud.

As shown in FIG. 1, some of the processes and data may be offloaded to offboard resources, such as the cloud. Offboarding may include: log data 120-125, shard processing output 160-165 and log slices 180-185. In FIG. 1, queries 195 from offboard may be used to examine the log data 120 and shard processing output 160 and to direct the shard processing 150.

Figure 2:
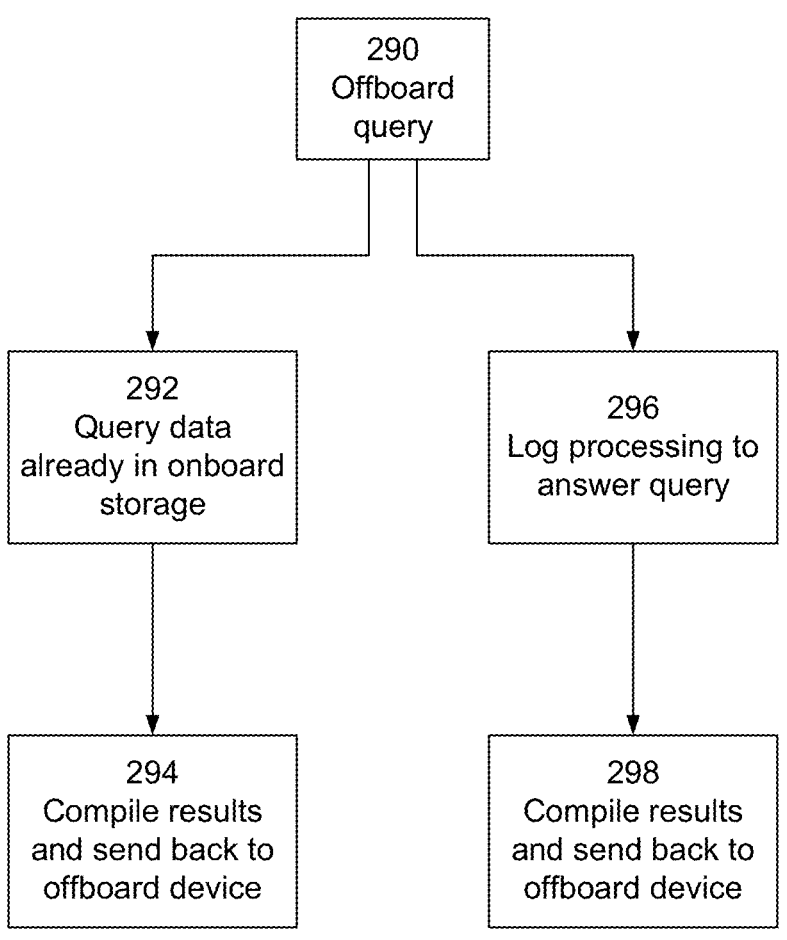
FIG. 2 is a diagram of offboard queries.

FIG. 2 is a diagram of offboard queries. A request 290 for computation can be sent from an offboard service (external to the robotics) that triggers onboard computation. FIG. 2 shows two possible paths. In the left path, the request queries data that has been computed already by the robotics and is in onboard storage 292. The results are compiled and returned 294. In the right path, the query is a request that the robotics has not previously performed 296. It then determines if onboard compute resources are available. Data is compiled and sent back to the offboard device 298.

Figure 3:
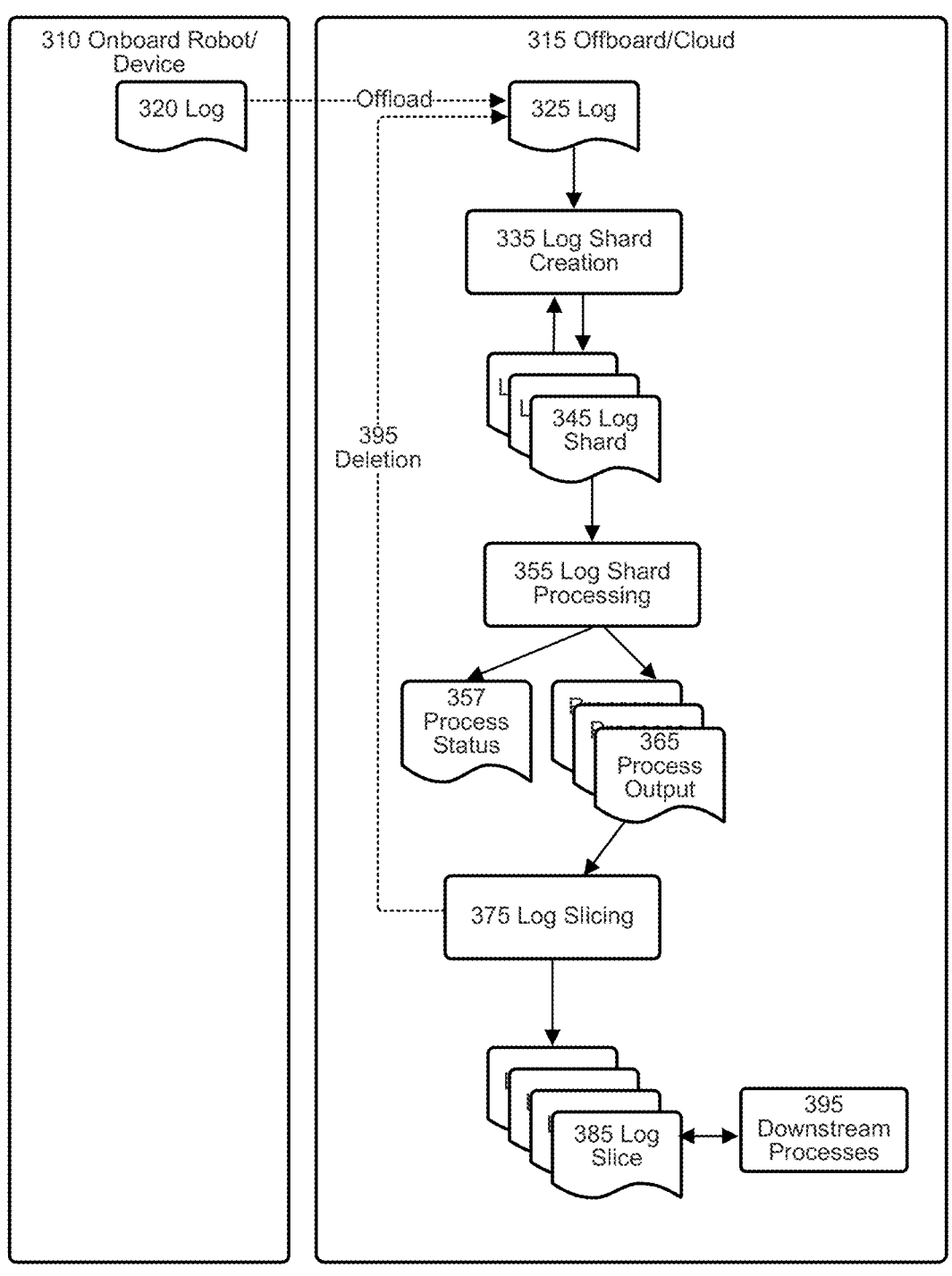
FIG. 3 is a diagram of offboard shard processing.

FIG. 3 is a diagram of offboard shard processing. Similar numbers are used in FIGS. 1 and 3. For example, the onboard processes are 110/310, the offboard processes are 115/315, etc. In this case, the process is similar to what is shown in FIG. 1, but the processes occur offboard instead of onboard. Log data may be sharded based on similar attributes: 1) user input or preferences, 2) cloud compute/storage cost, 3) available bandwidth, and 4) processing time optimizations. The output of the processes, along with process status, is stored offboard and is available to downstream processes 395.

Figure 4B:
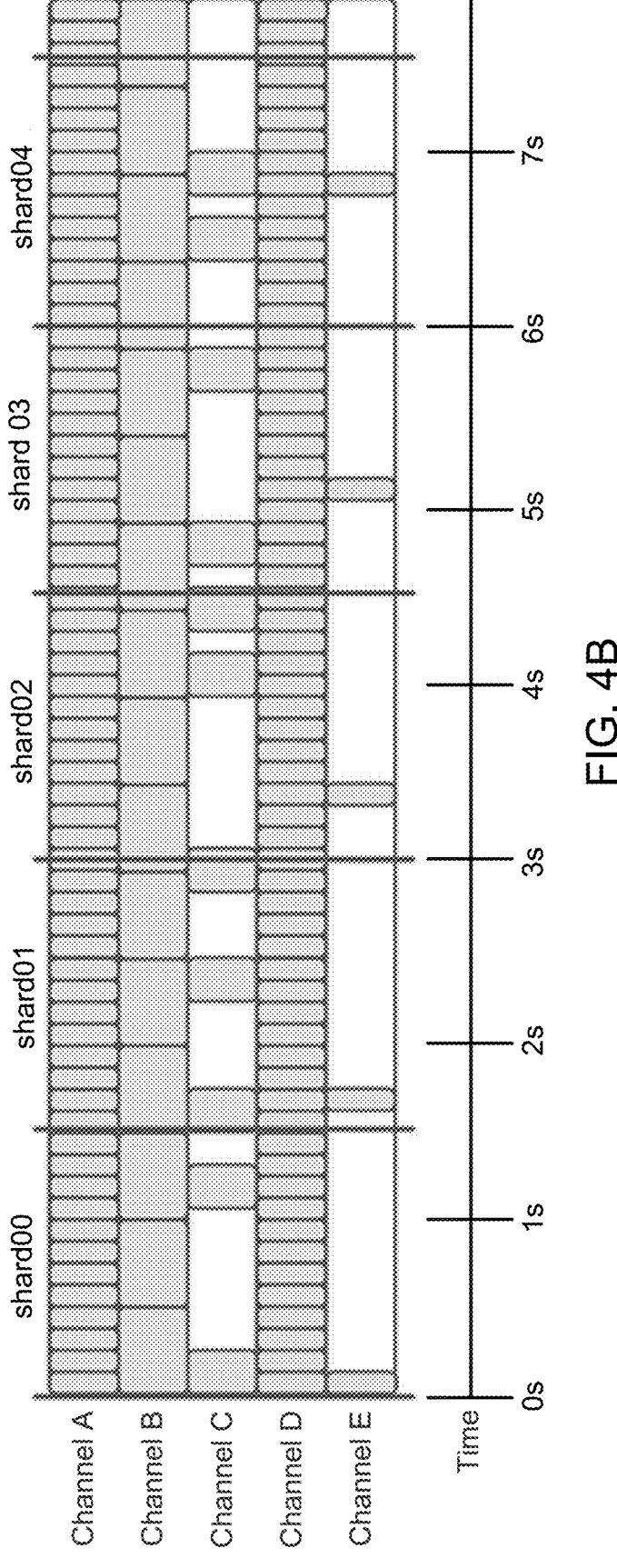

FIGS. 4A and 4B are diagrams of generating shards from robotics log data using user-configured shard definitions. The robotics log data may include log data for sensor inputs to the robotics, and log data for behavior of the robotics. Example of log data include ROS1 bag, ROS2 bag, time-series databases, and MCAP.

FIG. 4A show different aspects of shard definitions. The left box 410 lists different shard parameters, which may be user configured. The right box 420 lists different rules that are used to generate the shards. These may also be user-specified. Examples of these may include maximum number of shards, minimum shard duration, maximum shard duration, episodic message handling per channel (e.g., include latest message timestamped at or prior to shard start time).

Shard processing may be user configurable for both shard definition as well as processing and consolidating process outputs across shards (e.g., "stitching"). Shards are defined based on conditions optimized for available resources as well as the processing loads. Shard data can also be configured per channel, if needed.

FIG. 4B shows the initial stage of generation of shards from robotics log data. The x-axis in FIG. 4B is time. Each row in FIG. 4B is a different channel of log data: from channel A to channel E in this example. Each box is a message. Each channel includes a series of messages. For some channels (e.g., channels A, B, D), the messages are produced on a periodic basis. For some channels (e.g., channels C, E), the messages are episodic. For example, they may be driven by interrupts or certain conditions. The vertical lines demarcate the target durations of shards00, 01, 02, 03, etc. Each shard covers a different time window: 1.5 seconds in this example.

Figure 4C:
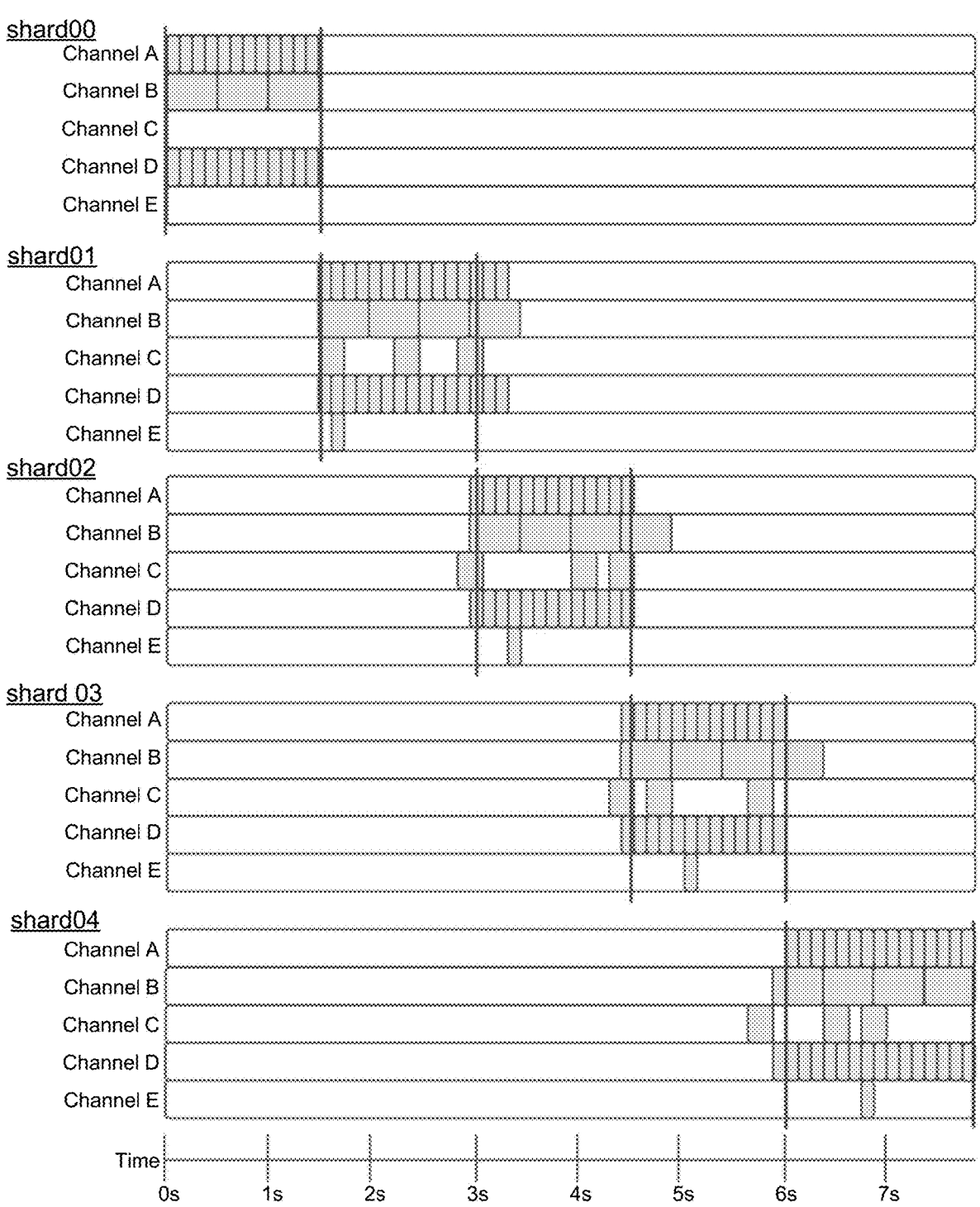

FIG. 4C shows the results of the sharding process. Note that shards have been processed to include messages from outside the 1.5 second time window. FIG. 4C shows shards00-04. Each shard is initially the collection of messages between the heavy vertical lines, but processing of each shard may use messages from adjacent shards.

FIGS. 5A-5D are diagrams of processing of shards. In these figures, the robotics log data has already been sharded, and the resulting shards are being processed. For example, this processing may be directed to looking for specific events, calculating statistics, answering queries, counting the number of detections of a specific object, identifying time ranges that have excessive acceleration values, identifying time ranges that have specific errors, identifying time ranges when the robotics has stood still for excessive periods of time, etc. The processes read the log data as a collection of channel messages per shard, per the shard definitions. Shards may be processed individually, including storing process status and output. As adjacent shards are processed, appropriate stitching and deduplication of output occurs as configured per process.

FIGS. 5A and 5B show tables of status and output for this processing. In this example, two processes p000 and p001 are used to process the shards. FIG. 5A shows the status at a moment in time. Process p000 has completed processing of shards00,02,03, and is in process for shard01. Process p001 has completed processing of shards00,02, is in process for shard03 and has not yet started shard01.

FIG. 5B is a table of results for the processing. Recall that each shard spans a time window of approximately 1.50 seconds. Shard00 spans 0-1.49, shard01 spans 1.50-2.99, etc. Processing p000 of shard00 produces three outputs: o000_00_00 which corresponds to time 0.10-0.50 of the log data, o000_00_01 corresponds to time 0.90-1.20, and o000_00_02 corresponds to time 1.45-1.49. In the output ID oxxx_yy_zz, xxx is the process ID, yy is the shard ID, and zz is the output identifier. The table in FIG. 5B is an index to the processing results. It may also contain other metadata for the processing and/or the results.

FIGS. 5C and 5D show two examples of stitching for processes p000 and p001, respectively. When events occur in separate and adjacent shards across the shard time boundaries, user-defined rules such as those in FIGS. 5C and 5D stitch two separate events into a single event. This allows the entire time range of the event to be used to indicate a single event as input to log slicing or to metrics (e.g., counting the number of a certain event type in a log).

FIG. 5C allows stitching of two adjacent shards. The rules for stitching in this example are the following. It must be the same process p000 and the two processed shards must be adjacent. The top table includes information from the output index of FIG. 5B and has been extended to include the Stitched column. This column contains a flag to indicate whether the shard processing output has been stitched with available process output (if any) from adjacent shards. In the top row, the shard processed is shard00. However, since Stitched=true, this means process output from adjacent shards (in this case, shard01) were stitched to process output from shard00. The bottom table in FIG. 5C summarizes the singular result of the stitching. Process outputs from shard00 and 01 are stitched together to form stitch 000 00 01, which now spans from 1.45-1.70 crossing the time border between the two stitched shards. Here, 00 01 indicate the starting shard and ending shard.

FIG. 5D allows stitching of process output from two or more adjacent shards. In this example, process outputs from shards00-02 are stitched together, to form stitch 001 00 02, which spans 0.00-4.49. Deduplication is also applied to ensure that any overlap in processing does not result in duplicate results or double counting.

Figure 6A:
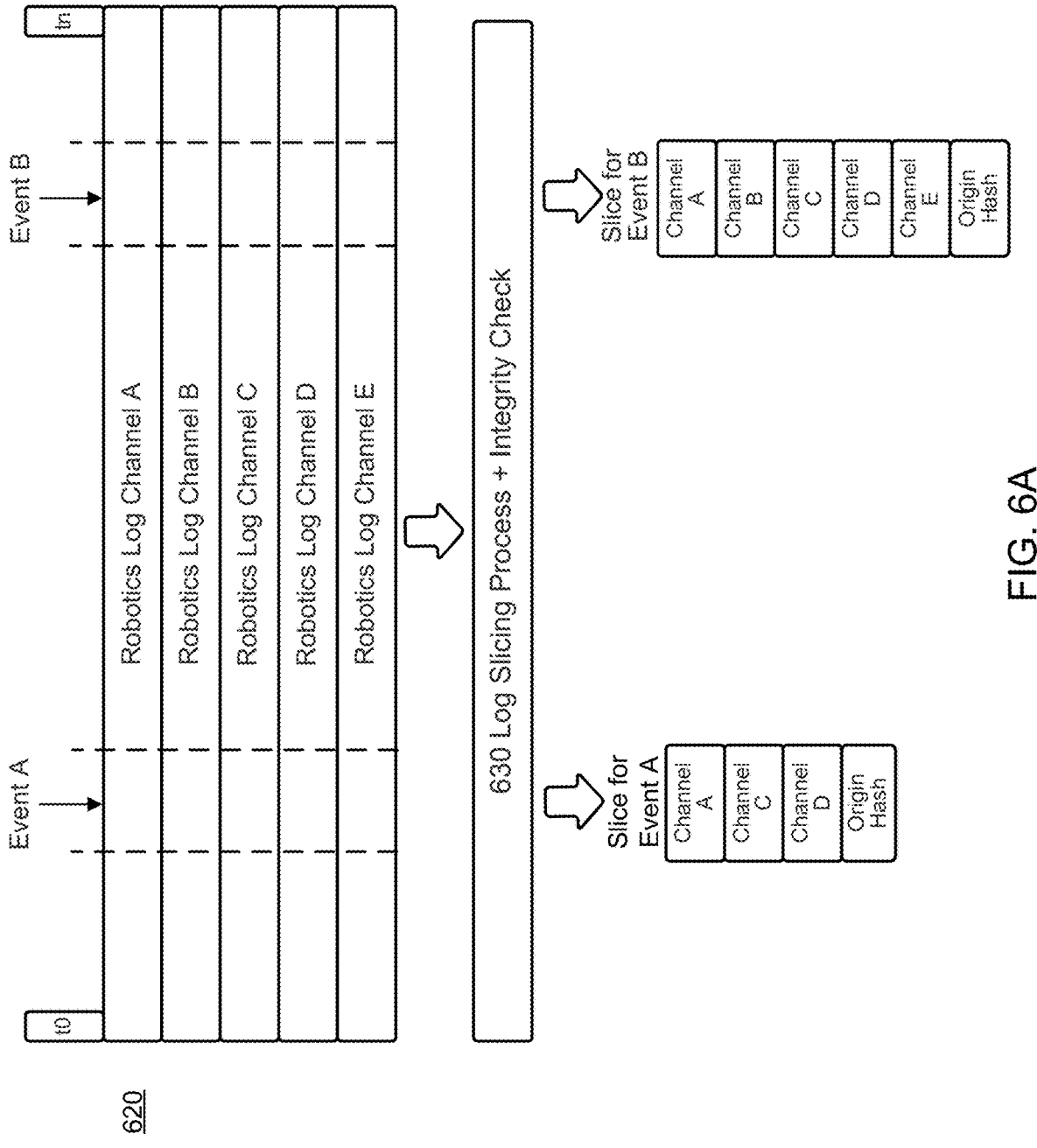

FIGS. 6A-6B are diagrams of log slicing. Event extraction using log slicing capabilities ensures whole, consumable log slices containing all required channel data for a particular use case are extracted for downstream use. Log slicing may include the following elements, which can be user configurable.

Data-driven rules defining the start and end of an event, including any required leading or trailing time.

Relevant channels.

Handling of channels containing episodic or sparsely periodic messages.

Integrity check level.

FIG. 6A shows log slicing from the multi-channel robotics log data 620. Sharding (processes 130 and 335 in FIGS. 1 and 3) and processing shards (processes 150 and 355 in FIGS. 1 and 3) identify events, and log slicing (processes 170 and 375 in FIGS. 1 and 3) extracts the relevant data for the identified events. In this example, there are two events, labeled A and B, for which log slicing extracts the relevant data. Examples of events include situations in which more than a certain threshold of objects are detected to be used for simulation or offline validation purposes, image frames in which certain objects are detected to be used for improving machine learning model training, time ranges in which unknown objects are detected to be used for machine learning training, time ranges in which specified errors occur to enable human triage of the errors, etc. Log slicing process 630 extracts the relevant channels (channels A,C,D for event A, and channels A-E for event B) from the shards, and also performs an integrity check. The integrity check is an origin hash in FIG. 6A.

FIG. 6B shows additional detail. The slices to be extracted for events can be user-specified (632). Some examples include the following: Set Start time to 5 seconds before event occurred; Set End time to 10 seconds after event occurred (e.g., to facilitate human triage); User may specify what channels they want in the slice (e.g., lidar, camera, object detector to send to a third party for machine learning ground truth labeling); Users can specify how to determine which messages (including periodic messages or "attachments") are required to ensure utility of a log slice based on the use case. Conditions such as those in the example for channels B, C, and E ensure required periodic messages are included in the slice to ensure availability of all required data to support the downstream process. For example, the event in FIG. 6B includes some messages that fall outside the defined time window, in order to ensure continuity of data.

As a part of the extraction process, an origin hash (634) may be generated from the source message payloads that will be included in the log slice. This hash can be validated after the log slice is created to ensure message payload integrity for those use cases requiring proof of integrity of the recorded data.

Figure 7:
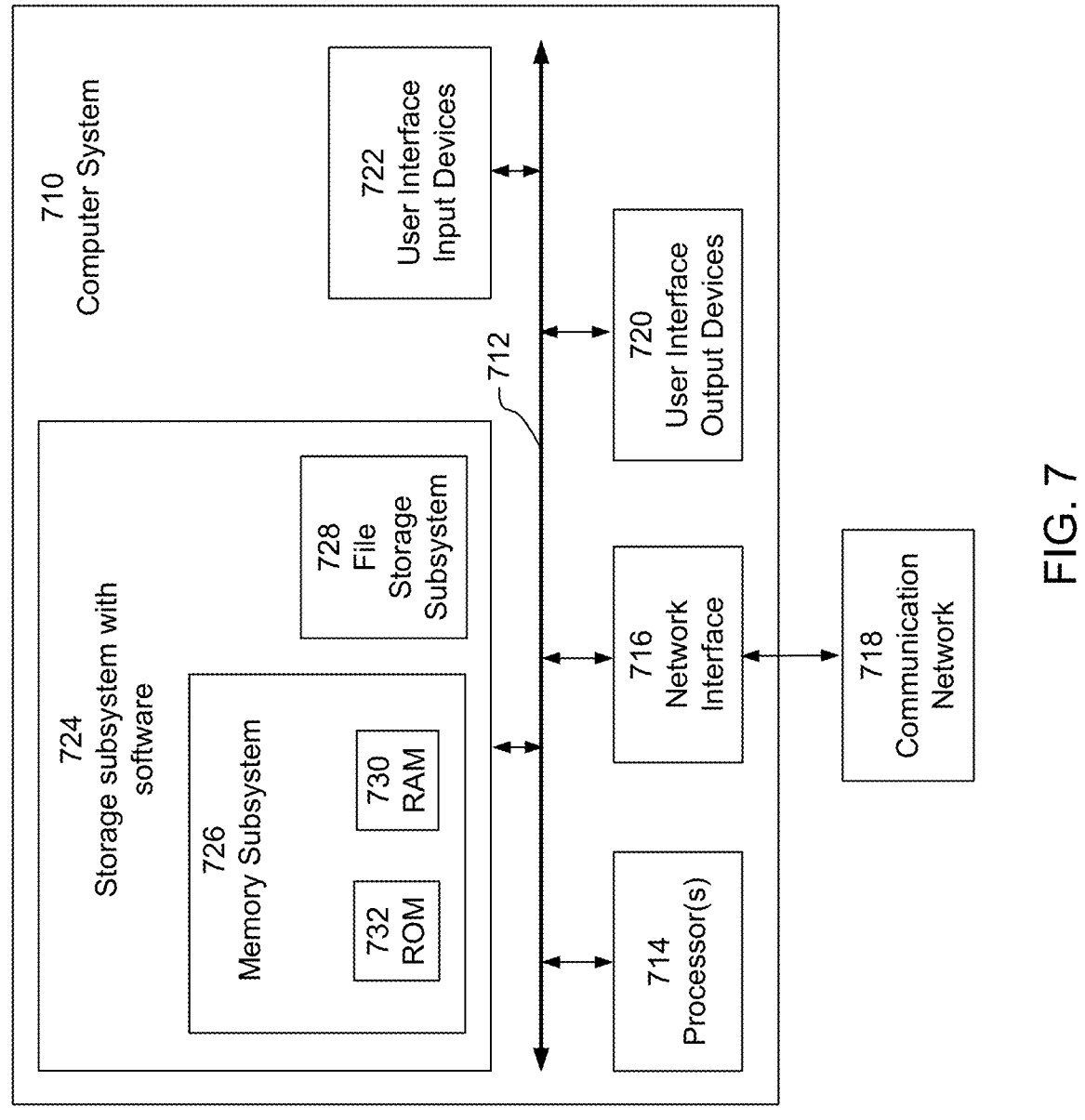
FIG. 7 is a diagram of a computer system suitable for use with embodiments disclosed herein.

FIG. 7 is a diagram of a computer system suitable for use with embodiments disclosed herein. Alternate embodiments are implemented in computer hardware, firmware, software, and/or combinations thereof. Implementations can be implemented in a computer program product tangibly embodied in a computer-readable storage device for execution by a programmable processor; and method steps can be performed by a programmable processor executing a program of instructions to perform functions by operating on input data and generating output. Embodiments can be implemented advantageously in one or more computer programs that are executable on a programmable computer system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits), FPGAs and other forms of hardware.

Although the detailed description contains many specifics, these should not be construed as limiting the scope of the invention but merely as illustrating different examples. It should be appreciated that the scope of the disclosure includes other embodiments not discussed in detail above. For example, the techniques described may be applied to IoT (Internet of Things) devices, medical monitoring devices and other devices beyond just robotics. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method for organizing robotics log data, the method comprising:

for each of a plurality of robots, processing onboard the robot, comprising:

collecting a plurality of channels of robotics log data for the robot, each channel comprising log data for sensor inputs to the robot and/or log data for behavior of the robot;

generating shards from the collected robotics log data, each shard associated with a time window for an event, comprising:

collecting the robotics log data for the time window for the shard and for channels relevant to the event; and including an index and metadata for the collected robotics log data for the shard; and making the shards from the plurality of robots available for processing.

2. The method of claim 1 wherein: for some channels, the robotics log data comprise periodically generated messages; and, for other channels, the robotics log data comprise episodically generated messages.

3. The method of claim 1 wherein the shards are independently consumable.

4. The method of claim 1 further comprising:

processing the shards in parallel for different shards.

5. The method of claim 1 wherein generating the shards comprises:

receiving user-specified rules; and generating the shards according to the user-specified rules.

6. The method of claim 5 wherein at least one of the user-specified rules is channel-specific.

7. The method of claim 1 further comprising:

processing the shards; and deduping results of processing the shards.

8. The method of claim 1 further comprising:

processing the available shards from the plurality of robots, including stitching processing results from different shards for events that span multiple shards.

9. The method of claim 1 further comprising:

generating sets of log slices from the shards for the events; and making the sets of log slices available for processing.

10. The method of claim 9 wherein, for at least one of the sets, the log slices include less than all of the channels.

11. The method of claim 9 wherein the log slices include integrity checks of the robotics log data in the log slices.

12. The method of claim 1 further comprising:

responsive to generating shards from the collected robotics log data, deleting the robotics log data from storage on the robot.

13. The method of claim 1 further comprising:

deleting the robotics log data after identifying the event, without transmitting the robotics log data offboard the robot.

14. The method of claim 1 further comprising:

transmitting the shards, rather than the robotics log data, offboard the robot.

15. A robot comprising a processing system configured to:

collect a plurality of channels of robotics log data for the robot, each channel comprising log data for sensor inputs to the robot and/or log data for behavior of the robot;

generate shards from the collected robotics log data, each shard associated with a time window for an event, comprising:

collecting the robotics log data for the time window for the shard and for channels relevant to the event; and including an index and metadata for the collected robotics log data for the shard; and process the shards onboard the robot.

16. The robot of claim 15 wherein the robotics log data is stored onboard the robot, and the processing system is further configured to:

delete the robotics log data after identifying the events, without transmitting the robotics log data offboard the robot.

17. The robot of claim 15 wherein the processing system is further configured to:

generate sets of log slices from the shards for the events.

18. The robot of claim 15 wherein the processing system is further configured to:

transmit metadata for the identified events offboard the robot.

* * * * *